United States Patent [19]

Bell, Jr. et al.

[11] Patent Number: 4,471,198
[45] Date of Patent: Sep. 11, 1984

[54] CUT-OFF PROTECTION SYSTEM FOR ELECTRICAL DISCHARGE MACHINING APPARATUS

[75] Inventors: Oliver A. Bell, Jr., Wilmington; Randall C. Gilleland, Troutman; Davey J. Chance, Concord, all of N.C.

[73] Assignee: Colt Industries Operating Corp., New York, N.Y.

[21] Appl. No.: 361,129

[22] Filed: Mar. 23, 1982

Related U.S. Application Data

[62] Division of Ser. No. 068,327, Aug. 21, 1979, abandoned.

[51] Int. Cl.³ .............................................. B23P 1/08
[52] U.S. Cl. .................. 219/69 G; 219/69 S
[58] Field of Search .................. 219/69 P, 69 S, 69 C, 219/69 M, 69 G

[56] References Cited

U.S. PATENT DOCUMENTS

| | | | |
|---|---|---|---|
| 3,614,368 | 10/1971 | Lobur | 219/69 P |
| 3,670,136 | 6/1972 | Saito et al. | 219/69 S |
| 3,697,879 | 10/1972 | Holliday | 219/69 C |
| 4,071,729 | 1/1978 | Bell, Jr. | 219/69 C |
| 4,292,490 | 9/1981 | Bell, Jr. et al. | 219/69 C |

Primary Examiner—M. H. Paschall
Attorney, Agent, or Firm—Harry R. Dumont

[57] ABSTRACT

A programmable system for controlling machining current magnitude and reducing it in a step function as gap voltage falls indicating gap short circuit condition. A set of off-time numbers are computed and stored in an off-time counter. These numbers are recomputed each time a new on or off time is entered in the pulse generator. The original off-time is the normal cutting parameter. As the gap voltage drops, indicating problems, the off-time starts doubling or increasing in a like manner until it has reached many times its normal duration.

4 Claims, 3 Drawing Figures

CUT-OFF PROTECTION SYSTEM FOR ELECTRICAL DISCHARGE MACHINING APPARATUS

REFERENCE TO RELATED APPLICATION

This application is a continuation-in-part of U.S. patent application No. 068,327 now abandoned filed on Aug. 21, 1979 for "Cut-Off Protection System for Electrical Discharge Machining Apparatus".

BACKGROUND OF THE INVENTION

The field to which the present invention relates is that generally known as electrical discharge machining, sometimes hereinafter referred to as EDM, in which material is removed from an electrically conductive workpiece by the action of electrical gap discharges occurring between a tool electrode and a workpiece. A dielectric coolant fluid is circulated and recirculated through the gap, usually under pressure, throughout the machining operation. An electrode or a workpiece servo feed system is used to provide relative movement and thus maintain an optimum gap spacing between the electrode and the workpiece as the workpiece material is being removed.

It is important to the process of EDM that the machining power pulses provided at the gap are of closely and precisely controllable on-off time and frequency to insure repeatability of results and to provide appropriate cutting action for the type of operation being carried on. Various types of pulse generators which have this capability have been developed and are in commercial use for EDM. One commonly used type of EDM power supply includes as a principal part of its machining power pulse generator an astable multivibrator in which on-off time and frequency are controlled and preset by a ganged capacitor and resistor arrangement. One example of this type of pulse generator and an associated protection system is shown and described in Kurt H. Sennowitz, U.S. Pat. No. 3,649,802, issued on Mar. 14, 1972 for "Protective System for Electrical Discharge Machining Power Supply Circuit", which patent is of common ownership herewith.

A further arrangement for a digital type EDM pulse generator is shown and described in Oliver A. Bell, Jr., U.S. Pat. No. 3,809,847, issued on May 7, 1974, for "Method and Apparatus for Electrical Discharge Machining."

A still further type of digital multivibrator is shown and described in Oliver A. Bell, Jr., U.S. Pat. No. 4,071,729, issued on Jan. 31, 1978, for "Adaptive Control System and Method for Electrical Discharge Machining." This patent shows an on and off time generator which received inputs from a programmable computer and from this general arrangement provides machining power pulses to the machining gap. All the above noted patents are of common ownership herewith.

The present invention is particularly designed for use with a digital type pulse generator that is controlled by a programmable computer or similar input device. Reference is made to our co-pending U.S. Pat. No. 4,320,279 issued on Mar. 16, 1982 for "Programmable Pulse Generator for Electrical Discharge Machining Apparatus".

SUMMARY OF THE INVENTION

Our invention provides a cut-off protection system for EDM which operates in a step function to lengthen off-time responsive to drop in gap voltage level indicating gap short circuit conditions. A set of cut-off times is computed each time the off-time is reset by the operator or entered by computer control. Each successive off-time in the set is doubled or multiplied by four or some other integer to reduce machining current.

BRIEF DESCRIPTION OF THE DRAWINGS

The present invention, its operation, features and advantages, and the advancements which it affords will be understood from the following specification together with the drawings in which like numerals are used to refer to similar or like parts where they occur, and wherein.

DETAILED DESCRIPTION OF THE PREFERRED EMBODIMENT

Figure 1:
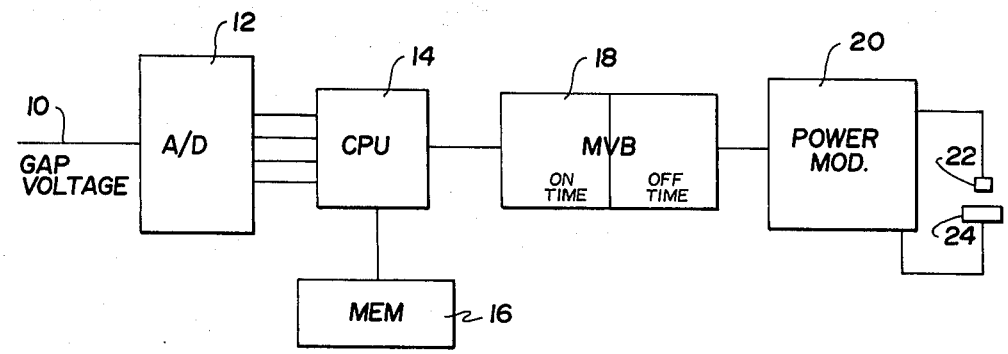
FIG. 1 is a block diagrammatic showing of the system with which our invention is used.

FIG. 1 shows the basic parts of a programmable computer and an associated electrical discharge machining apparatus. Gap voltage is sensed by a voltage sensing network 10. The gap voltage is passed through an analog to digital converter 12 and then to the CPU 14 of the programmable computer. The memory 16 of the microprocessor is also shown. One example of a microprocessor suitable for use in connection with this invention is the microprocessor currently manufactured and sold by the Mostek Corporation, 1215 West Crosby Road, Carrollton, Tex. 75006 and known as the Model MK 3880.

Also shown in FIG. 1 is a digital pulse generator 18 of the counter type as shown and described in our co-pending application No. 068,328 referred to above. One counter is set to represent machining pulse on-time. The EDM power output module is indicated by the numeral 20 and includes the main DC source and an output power switch turned on and off by the pulse generator 18 to provide machining power pulses to the machining gap. The machining gap is defined between a tool electrode 22 and a workpiece 24. The gap voltage signal is shown at the left hand side of the drawing. It is used in the pulse generator 18 to control the off-time in a manner that will be further explained in the section "Description of Operation," hereinafter. It will further be clarified by inclusion of a program for the microprocessor.

Figure 3:
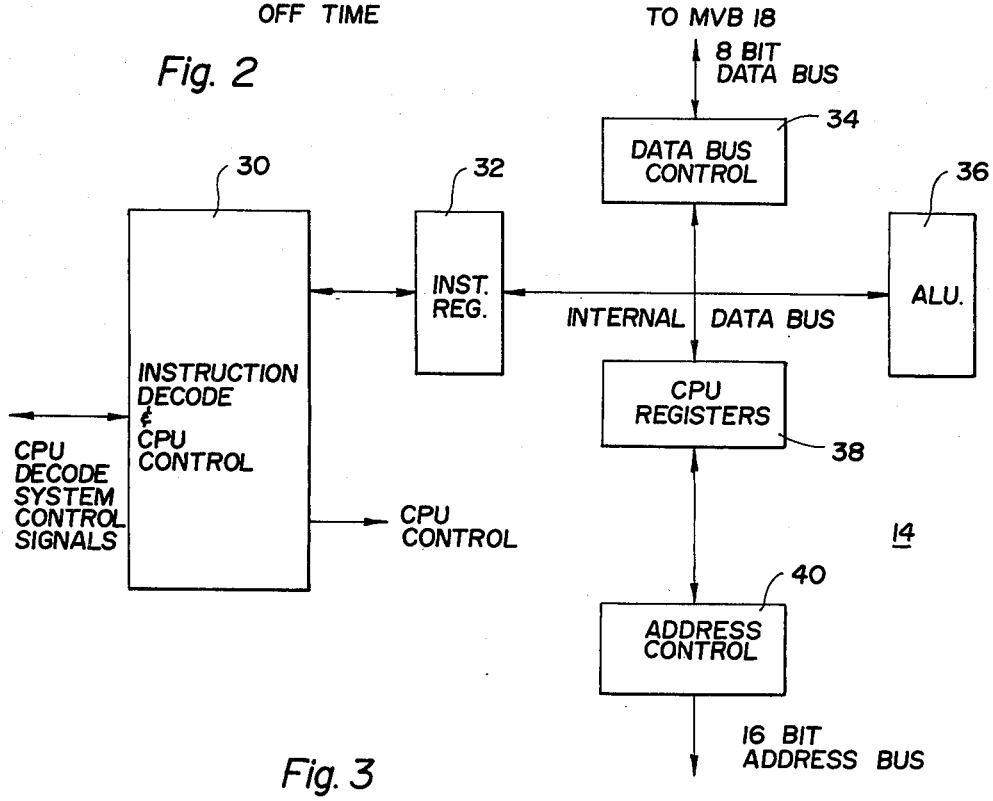
FIG. 3 is a block diagrammatic drawing showing one programmable computer or microprocessor used with the present invention.

FIG. 3 is a block diagram of the major elements in the CPU 14. These include the CPU Control 30, internal register 32, data bus control 34, arithmetic logic unit 36, CPU registers 38, and address control 40. The several interfaces and data busses are also shown in the drawing. While the described embodiment of the invention includes elements of a microprocessor, the invention is not limited to this type of computer. A variety of different programmable computers can be used.

DESCRIPTION OF OPERATION

The machining pulse off-time and on-time are entered from memory 16 or from an operator keyboard. The protection system operates by modifying the off-time only, responsive to drop in gap voltage. The on-time is not altered. This is because the off-time is not a factor in overcut or finish. The on-time controls peak current and does affect these factors. The gap voltage signal is passed through A/D converter 12 to get an 8 bit representation of gap voltage. We derive a table of references by multiplying the off-time by two and loading it in the cut-off table. This redoubling is repeated until we have a multiplication by 64 times the original off-time. The invention is not limited to the use of a particular ratio. The factor could be four. It is important that the cut-off be controlled in gradual steps rather than abruptly. We have found that this type of cut-off improves the stability of cut.

The table of numbers starts with the lowest number. The table is loaded into CPU Register 38. The first number is subtracted from the 8 bit digital representation of gap voltage level. If the number resulting from the subtraction is positive, i.e. the reference voltage is smaller than the gap voltage, then we go on to the next step. The original off-time is used as the normal cutting parameter. As the gap voltage decreases, the off-time starts doubling until it reaches 64 times its normal amount. Thus, if the off-time were 10 microseconds, we could load up to 640 microseconds of cut-off. This provides a very broad latitude of protection. When cutting is normal and relatively stable, the cut-off values used most often are the times 2 and times 4. If the gap is in a dead short condition, the off-time would go to 64 times. As shown in FIG. 1, the control signal from the CPU 14 and from the 8 bit data bus is passed to the off-time control counter of the pulse generator 18 to change the off-time. Reference is made to the above noted co-pending application for a detailed explanation of the manner in which that operation is handled. Reference is also made to the explanatory routines in the following program:

CUTOFF

| Address | | Label | Instruction | Comment |
|---|---|---|---|---|
| 01017 0201 0E00 | | CUTOFF | LD C,O | SET UP FOR OFFTIME LOAD WHEN LDCT IS CALLED |
| 01018 0203 D9 | | | EXX | SWAP REG |
| 01019 0204 3E00 | | | LD A,O | CLEAR |
| 01020 0206 328120 > | | | LD (ELOP),A | SAVE IT |
| 01021 0209 7A | | | LD A,D | ALT. DE = ARC AND REF |
| 01022 020A D9 | | | EXX | SWAP BACK |
| 01023 020B CB3F | | | SRL A | DIVIDE BY 2 |
| 01024 020D 47 | | | LD B,A | SAVE IT |
| 01025 020E 3A7B20 > | | | LD A,(CUREF) | GET BIAS |
| 01026 0211 80 | | | ADD A,B | OFFSET THE ARC NUMBER |
| 01027 0212 47 | | | LD B,A | SAVE THE ORIGINAL VALUE |
| 01028 0213 210211 > | | | LD HL,NORMV | SET UP FOR NORMAL CUTTING VOLTAGE |
| 01029 | | | MTEST HIPON,DRIVE | WAS HIPOL ON |
| 0216 3A6B20> + | | | LD A,(DRIVE) | |
| 0219 CB47 + | | | BIT HIPON,A | |
| 01030 021B 78 | | | LD A,B | GET ARC VOLTAGE BACK |
| 01031 021C CA2202> | | | JP Z CU1 | Z FLAG SET IF HIPOL OFF |
| 01032 020F 21FC10> | | | LD HL,HIV | SET FOR HIGH VOLTAGE |
| 01033 0222 96 | | CU1 | SUB (HL) | IS ARC<FIRST VALUE |
| 01034 0223 23 | | | INC HL | BUMP POINTER TO ARC COMPARASON |
| 01035 0224 F23502> | | | JP P,CU2 | IF NO OVERFLOW ARC>10 VOLTS |
| 01036 0227 3E80 | | | LD A,080H | RUBBOUT |
| 01037 0229 328120> | | | LD (ELOP),A | STUFF IT |
| 01038 022C 2A0F20> | | | LD HL,(CUTAB1) | GET OFFTIME TIMES 64 |
| 01039 022F 225520> | | | LD (CUTOF),HL | SAVE IT |
| 01040 0232 C39202> | | | JP LDCT | LOAD NEW OFFTIME |
| 01041 0235 78 | | CU2 | LD A,B | RESTORE VALUE |
| 01042 0236 96 | | | SUB (HL) | IS ARC<SECOND VALUE |
| 01043 0237 23 | | | INC HL | BUMP COMPARE POINTER |
| 01044 0238 F24902> | | | JP P,CU3 | NO |
| 01045 023B 3E80 | | | LD A,080H | RUBBOUT |
| 01046 023D 328120> | | | LD (ELOP),A | SAVE IT |
| 01047 0240 2A1120> | | | LD HL,(CUTAB2) | OFF TIME * 32 |
| 01048 0243 225520 > | | | LD (CUTOF), HL | SAVE IT |
| 01049 0246 C39202 > | | | JP LDCT | LOAD IT |
| 01050 0249 78 | | CU3 | LD A,B | RESTORE VALUE |
| 01051 024A 96 | | | SUB (HL) | IS ARC<THIRD VALUE |
| 01052 024B 23 | | | INC HL | BUMP COMPARE POINTER |
| 01053 024C F25D02> | | | JP P,CU4 | NO |
| 01054 024F 3E80 | | | LD A,080H | RUBBOUT |
| 01055 0251 328120> | | | LD (ELOP), A | SAVE IT |
| 01056 0254 2A1320> | | | LD HL, (CUTAB3) | OFFTIME * 16 |
| 01057 0257 225520> | | | LD (CUTOF),HL | SAVE IT |
| 01058 025A C39202> | | | JP LDCT | AND LOAD IT |
| 01059 025D 78 | | CU4 | LD A,B | RESTORE THE VALUE |
| 01060 025E 96 | | | SUB (HL) | IS ARC<FORTH VALUE |
| 01061 025F 23 | | | INC HL | BUMP COMPARE POINTER |
| 01062 0260 F27102> | | | JP P,CU5 | NO |
| 01063 0263 3E80 | | | LD A,080H | RUBBOUT |
| 01064 0265 328120> | | | LD (ELOP),. A | SHOW IT |
| 01065 0268 2A1520> | | | LD HL, (CUTAB4) | OFTIME * 8 |
| 01066 026B 225520> | | | LD (CUTOF),HL | SAVE IT |
| 01067 026E C39202> | | | JPLDCT | LOAD IT |
| 01068 0271 78 | | CU5 | LD A,B | RESTORE THE VALUE |
| 01069 0272 96 | | | SUB (HL) | IS ARC<FIFTH VALUE |

| CUTOFF | | | |
|---|---|---|---|
| 01070 0273 23 | | INC HL | BUMP COMPARE POINTER |
| 01071 0274 F28002> | | JP P,CU6 | NO |
| 01072 0277 2A1720> | | LD HL, (CUTAB5) | OFFTIME * 4 |
| 01073 027A 225520> | | LD (CUTOF),HL | SAVE IT |
| 01074 027D C39202> | | JP LDCT | LOAD IT |
| 01075 0280 78 | CU6 | LD A,B | RESTORE THE VALUE |
| 01076 0281 96 | | SUB (HL) | IS ARC<SIXTH VALUE |
| 01077 0282 23 | | INC HL | BUMP COMPARE POINTER |
| 01078 0283 F28C02> | | JP P,CU7 | NO |
| 01079 0286 2A1920> | | LD HL,(CUTAB6) | OFFTIME * 2 |
| 01080 0289 225520> | | LD (CUTOF),HL | SAVE IT |
| 01081 028C 2A0320> | CU7 | LD HL, (OFTIM) | GET ORIGINAL OFF TIME |
| 01082 028F 225520> | | LD (CUTOF),HL | SAVE IT |

Figure 2:
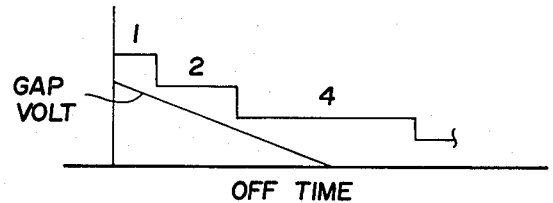
FIG. 2 is a graph showing the operation of the cut-off system and clarifying the relationship between gap voltage and pulse off-time.

It will be seen that so long as the gap voltage output from A/D converter 12 is greater than the first reference number in the table, we will continue to leave the regular off-time loaded in the off-time counter portion of the pulse generator or multivibrator 18. The first time that we get an A to D conversion with a number that is below the reference number, the pointer in the cut-off table will start searching down the table to see how low it is. As this gap voltage goes lower, the off-time that will be loaded in the off-time counter of the pulse generator will be higher. Thus, the magnitude of gap current will be reduced in a gradual stepped manner rather than a linear manner. This mode of operation is shown in FIG. 2.

Thus the pre-computed off-times are substituted one after the other seriatim in order of progressively larger values in place of the regular off-time until return to normal gap voltage level.

It will therefore be seen, that we have provided a new and improved cut-off protection system for electrical discharge machining.

We claim:

1. A gap short circuit protection system for electrical discharge machining apparatus having a precisely settable machining power pulse off-time and on-time, comprising;
    means for presetting the off-time and on-time;
    means for predetermining and storing a set of progressively larger values for off-time;
    means for sensing gap voltage and providing an output signal representative thereof; and
    means for successively substituting all of said values of said set in order of their increase responsive to drop in magnitude of said output signal until its return to a level corresponding to normal machine level and then returning to the smallest value of said set.

2. The combination as set forth in claim 1 wherein said predetermined off-time values are entered from a programmable computer memory.

3. The combination as set forth in claim 1 wherein said predetermined off-time values are entered from an operator keyboard.

4. The combination as set forth in claim 1 wherein said off-time and said set are entered in a register of a programmable computer for operation.

* * * * *